(12) United States Patent
Koonce et al.

(10) Patent No.: US 12,324,999 B2
(45) Date of Patent: *Jun. 10, 2025

(54) FILTER INLINE HEATER

(71) Applicant: Shaw Development, LLC, Bonita Springs, FL (US)

(72) Inventors: John R. Koonce, Naples, FL (US); Michael O'Hara, Naples, FL (US)

(73) Assignee: SHAW DEVELOPMENT, LLC, Bonita Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,333

(22) Filed: May 2, 2022

(65) Prior Publication Data

US 2022/0258079 A1    Aug. 18, 2022

Related U.S. Application Data

(63) Continuation of application No. 16/281,555, filed on Feb. 21, 2019, now Pat. No. 11,318,401, which is a continuation of application No. 14/723,632, filed on May 28, 2015, now Pat. No. 10,245,534.

(51) Int. Cl.
| | | |
|---|---|---|
| *B01D 35/00* | (2006.01) | |
| *B01D 29/11* | (2006.01) | |
| *B01D 35/18* | (2006.01) | |
| *B01D 35/30* | (2006.01) | |
| *F02M 37/30* | (2019.01) | |

(52) U.S. Cl.
CPC .......... *B01D 35/005* (2013.01); *B01D 29/114* (2013.01); *B01D 35/18* (2013.01); *B01D 35/30* (2013.01); *F02M 37/30* (2019.01)

(58) Field of Classification Search
None
See application file for complete search history.

(56) References Cited

U.S. PATENT DOCUMENTS

| | | |
|---|---|---|
| 3,235,084 A | 2/1966 | King et al. |
| 3,967,492 A | 7/1976 | Allington |
| 4,395,996 A | 8/1983 | Davis |
| | (Continued) | |

FOREIGN PATENT DOCUMENTS

| | | |
|---|---|---|
| CA | 1185540 A | 4/1985 |
| EP | 2065578 A1 | 6/2009 |
| | (Continued) | |

*Primary Examiner* — Robert J Popovics
(74) *Attorney, Agent, or Firm* — McDonald Hopkins LLC

(57) ABSTRACT

A filter assembly comprising a housing, a filter, a heater, hose fittings, a heat bridge, and insulators. The housing defines interior and exterior regions communicating through apertures. The filter separate the housing into a region upstream of the filter comprising an aperture, and a region downstream of the filter comprising an aperture. The heater extends into the interior region. The hose fittings are each coincident with an aperture and are formed of a material having a high thermal conductivity. The heat bridge is formed of a material having a high thermal conductivity and thermally connects the heater to the hose fittings. The insulators each are formed of a material having a low thermal conductivity, and each at least partially cover a hose fitting.

25 Claims, 4 Drawing Sheets

(56) References Cited

U.S. PATENT DOCUMENTS

| | | | |
|---|---|---|---|
| 4,477,345 A * | 10/1984 | Szlaga, Jr. | F02M 37/32 |
| | | | 210/130 |
| 4,510,051 A | 4/1985 | Diry | |
| 5,110,460 A | 5/1992 | Gilas | |
| 5,211,845 A | 5/1993 | Kaneshige | |
| 6,839,508 B2 | 1/2005 | Biess et al. | |
| 6,901,748 B2 | 6/2005 | Gomulka | |
| 7,396,473 B1 | 7/2008 | Guynn | |
| 7,398,771 B2 | 7/2008 | Theorell et al. | |
| 7,836,684 B2 | 11/2010 | Starck et al. | |
| 7,966,811 B2 | 6/2011 | Reed | |
| 8,038,872 B2 | 10/2011 | Jokschas et al. | |
| 8,051,644 B2 | 11/2011 | Gonze et al. | |
| 8,209,957 B2 | 7/2012 | Behrendt et al. | |
| 8,231,779 B2 | 7/2012 | Jokschas et al. | |
| 8,234,854 B2 | 8/2012 | Kesse et al. | |
| 8,282,819 B2 | 10/2012 | Parra Navarrete et al. | |
| 8,424,777 B2 | 4/2013 | Mokire et al. | |
| 8,448,426 B2 | 5/2013 | Peucat et al. | |
| 8,484,957 B2 | 7/2013 | Hodgson et al. | |
| 8,518,354 B2 | 8/2013 | Ayyappan et al. | |
| 8,523,018 B2 | 9/2013 | Wilkins | |
| 8,641,896 B2 | 2/2014 | Remacha et al. | |
| 8,850,797 B2 | 10/2014 | Dougnier et al. | |
| 8,875,495 B2 | 11/2014 | Perrin | |
| 8,955,311 B2 | 2/2015 | Brueck et al. | |
| 8,959,903 B2 | 2/2015 | Myer | |
| 9,808,750 B2 | 11/2017 | Klein | |
| 10,112,725 B2 | 10/2018 | Fausett et al. | |
| 10,245,534 B2 | 4/2019 | Koonce et al. | |
| 10,307,701 B2 | 6/2019 | Klein | |
| 10,697,411 B2 | 6/2020 | Girondi | |
| 10,744,428 B2 | 8/2020 | Wyhler et al. | |
| 11,318,401 B2 | 5/2022 | Koonce et al. | |
| 2011/0271754 A1 | 11/2011 | Ross, Jr. et al. | |
| 2013/0199979 A1 | 8/2013 | Jauss et al. | |
| 2016/0346715 A1 * | 12/2016 | Koonce | B01D 35/30 |

FOREIGN PATENT DOCUMENTS

| | | |
|---|---|---|
| EP | 1698769 B1 | 4/2010 |
| EP | 2273082 A1 | 1/2011 |
| EP | 2336514 A2 | 6/2011 |
| EP | 2199588 B1 | 8/2011 |
| FR | 2549148 A1 | 1/1985 |

* cited by examiner

FILTER INLINE HEATER

CROSS-REFERENCE TO RELATED APPLICATION

This application is a continuation of U.S. application Ser. No. 16/281,555 filed on Feb. 21, 2019, entitled "FILTER INLINE HEATER," which claims priority to U.S. patent application Ser. No. 14/723,632 filed on May 28, 2015, each of which are incorporated by reference herein in their entireties.

TECHNICAL FIELD

The present subject matter relates generally to a component of a liquid reducing agent delivery system. More specifically, present subject matter relates to heating a filter assembly of a liquid reducing agent delivery system.

SUMMARY

Provided is a filter assembly comprising a housing, a filter, a heater, hose fittings, a heat bridge, and an insulators. The housing defines interior and exterior regions communicating through apertures. The filter separates the housing into a region upstream of the filter comprising an aperture, and a region downstream of the filter comprising an aperture. The heater extends into the interior region. The hose fittings are each coincident with an aperture and are formed of a material having a high thermal conductivity. The heat bridge is formed of a material having a high thermal conductivity and thermally connects the heater to the hose fittings. The insulators each are formed of a material having a low thermal conductivity, and each at least partially cover a hose fitting.

Also provided is a filter assembly comprising a housing defining an interior region and exterior region, the interior region and the exterior region being in communication through a first aperture and a second aperture; a filter adapted for filtering an aqueous urea solution, the filter within the housing, the filter separating the housing into an upstream region upstream of the filter, the upstream region communicating with the first aperture, and a downstream region downstream of the filter, the downstream region communicating with the second aperture; a heater extending into the interior region of the housing; a first hose fitting communicating with the first aperture, the first hose fitting formed of a material having a thermal conductivity of at least 16 W/(m*K); a second hose fitting communicating with the second aperture, the second hose fitting formed of material having a thermal conductivity of at least 16 W/(m*K); a heat bridge formed of a conductive material having a thermal conductivity of at least 16 W/(m*K), thermally connecting the heater to the first hose fitting, and thermally connecting the heater to the second hose fitting; and a first insulator formed of a material having a thermal conductivity of at most 0.25 W/(m*K), the first insulator at least partially covering the first hose fitting; and a second insulator formed of a material having a thermal conductivity of at most 0.25 W/(m*K), the second insulator at least partially covering the second hose fitting.

Further provided is a filter assembly for filtering aqueous urea solution. The filter assembly comprising a housing defining an interior region and exterior region, the interior region and the exterior region being in communication through a first aperture and a second aperture. The housing includes a first sub-housing and a second sub-housing releasably attached to each other by a fastener; a filter adapted for filtering an aqueous urea solution, the filter received within the housing, the filter separating the housing into an upstream region upstream of the filter, the upstream region communicating with the first aperture, and a downstream region downstream of the filter, the downstream region communicating with the second aperture; a heater supported on the second sub-housing and extending into the interior region of the housing, wherein the heater is in thermal communication with at least the downstream region; a first hose fitting communicating with the first aperture; a second hose fitting communicating with the second aperture, wherein the first hose fitting and second hose fitting are supported on the second sub-housing; a heat bridge supported on the second sub-housing, formed of a conductive material having a thermal conductivity of at least 16 W/(m*K), thermally connecting the heater to the first hose fitting, and thermally connecting the heater to the second hose fitting; and a first insulator formed of a material having a thermal conductivity of at most 0.25 W/(m*K), the first insulator at least partially covering the first hose fitting; and a second insulator formed of a material having a thermal conductivity of at most 0.25 W/(m*K), the second insulator at least partially covering the second hose fitting.

DETAILED DESCRIPTION

In some operations, such as, without limitation, over-stoichiometric operation, internal combustion engines can produce one or more nitrogen oxides as a combustion product. Conversion of nitrous oxide into other compounds may reduce nitrogen oxide emissions of an internal combustion engine. It is possible to convert nitrogen oxide into nitrogen and water using selective catalytic reduction (SCR) technology. In a SCR system, an aqueous urea solution may be used as a reducing agent.

Aqueous urea solution may freeze under certain conditions rendering the aqueous urea solution unable to flow and unable to be used in the SCR system. Accordingly, it is desirable to provide a heating system adapted to deliver heat to one or more components of a SCR system in order to thaw or prevent the freezing of the aqueous urea solution.

Some components of the SCR system may be more difficult to thaw quickly. It remains desirable to provide a heater for the filter assembly of a SCR system that can thaw a desired mass of frozen aqueous urea solution quickly.

Figure 1:
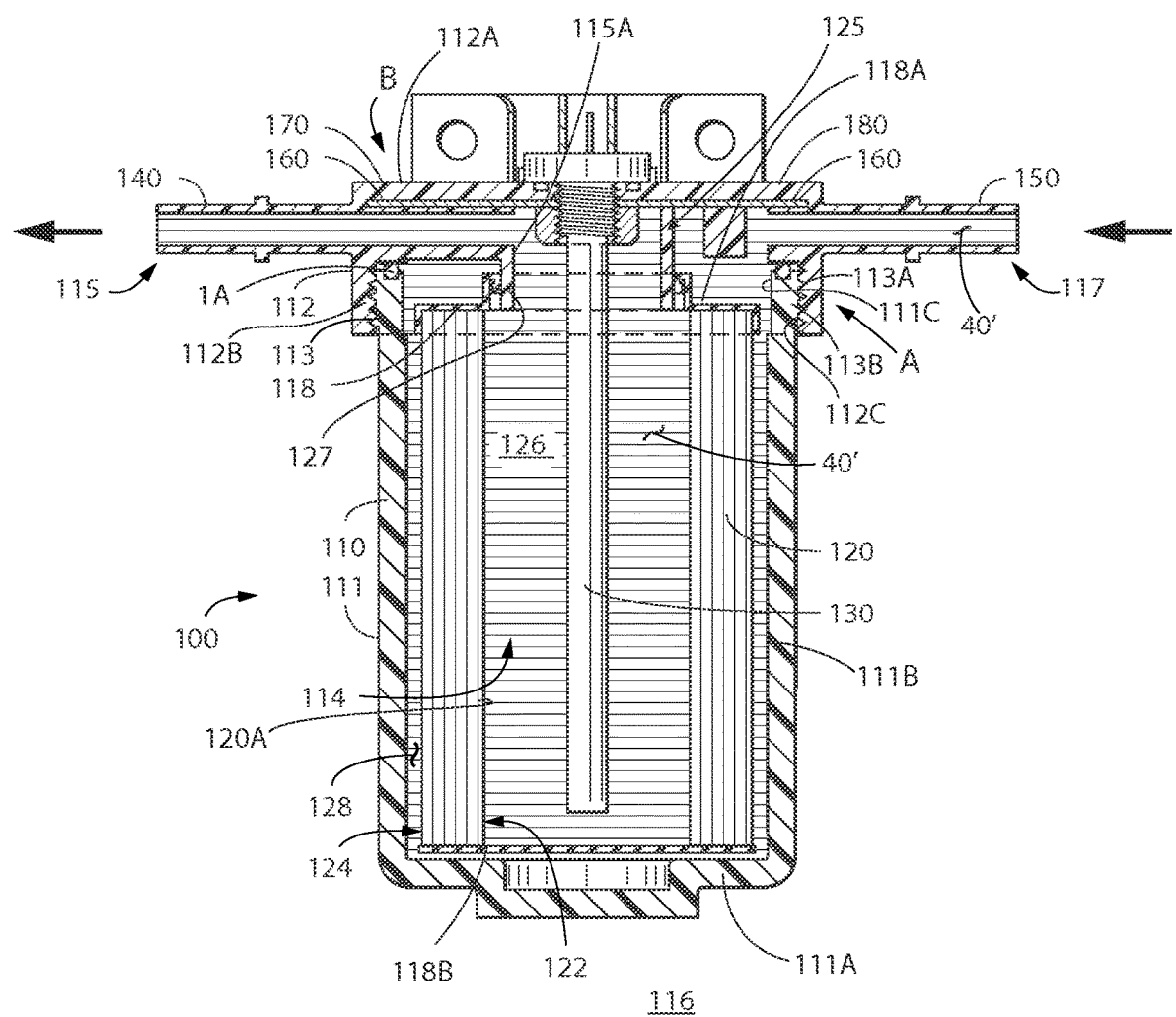
FIG. 1 is an sectional elevational view of a first embodiment of a filter inline heater.
Figure 2:
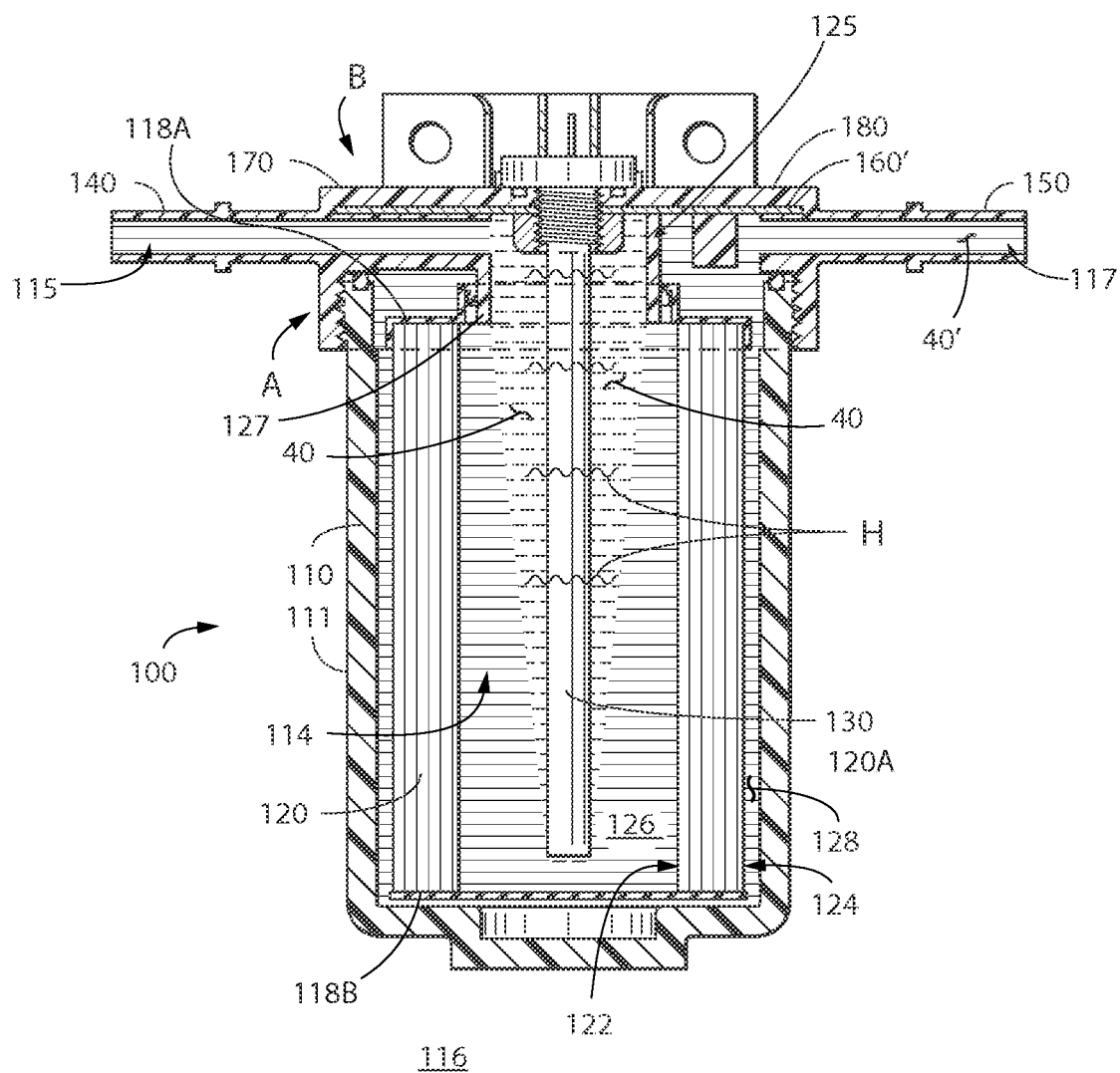
FIG. 2 is an sectional elevational view of a first embodiment of a filter inline heater.
Figure 3:
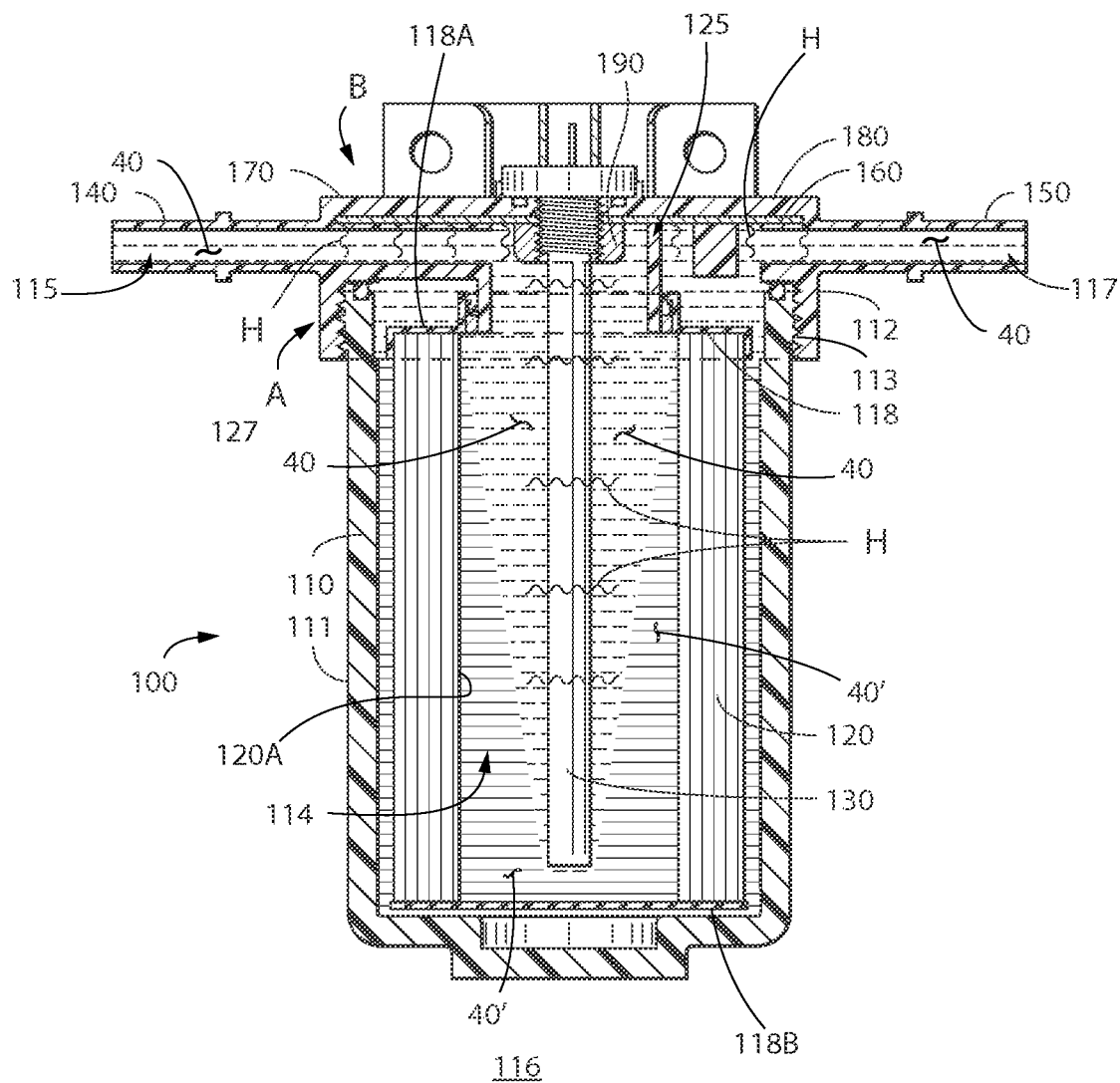
FIG. 3 is an sectional elevational view of the first embodiment of a filter inline heater.

Referring now to FIGS. 1, 2 and 3, shown is a first embodiment of a filter assembly 100. The first embodiment of a filter assembly 100 comprises a housing 110, a filter 120, a heater 130, a first hose fitting 140, a second hose fitting 150, a heat bridge 160, a first insulator 170, and a second insulator 180. In the non-limiting first embodiment shown in FIGS. 1, 2 and 3, the filter assembly 100 is adapted to filter a fluid aqueous urea solution 40. In the non-limiting first embodiment of a filter assembly 100 shown in FIG. 1, fluid aqueous urea solution 40 is frozen and is shown as frozen aqueous urea solution 40'. In the non-limiting first embodiment of a filter assembly 100 shown in FIGS. 2 and 3, some of the fluid aqueous urea solution 40 is shown as fluid, and some is frozen and is shown as frozen aqueous urea solution 40'.

In FIGS. 1 and 3, the heat bridge 160 is shown in a functional state. For sake of contrast, in FIG. 2, the heat bridge is shown in a non-functional state. The nature of the functionality of the heat bridge 160 and the effect on the function of the filter assembly 100 will be discussed in further detail herebelow.

With continued reference to FIGS. 1, 2 and 3, housing 110 defines an interior region 114 and exterior region 116. The interior region 114 and exterior region 116 are in communication with one another through a first aperture 115 and through a second aperture 117. The housing 110 may be formed as a single piece or multiple sub-housings or components may be assembled to form housing 110. With continued reference to FIGS. 1 and 3, housing 110 may comprise a first sub-housing 111 and a second sub-housing 112. The first sub-housing 111 and the second sub-housing 112 may be attached by a fastener 113. Fastener 113 may be a mechanical fastener such as a clip, snap fit edge, an external thread 113A and internal thread 113B formed on opposite sub-housings, as shown, or other fastener including but not limited to a weld or an adhesive. For example and without limitation, in FIGS. 1 and 3, first sub-housing 111 and a second sub-housing 112 are threadedly engaged by to one another at A by an external thread 113A formed on first sub-housing 111 and an internal thread 113B formed on second sub-housing 112. A seal 119 may be incorporated at or near the joint A of first and second sub-housings 111, 112 to further form fluid-tight engagement between the sub-housings. For example, an O-ring seal 1A may be provided between first and second sub-housings 111, 112. It should be understood that there are many acceptable means to facilitate fluid tight engagement, compression fitting, welding, soldering, brazing, mechanical fasteners, adhesives, etc., and that threaded engagement and seal is only one such means.

In the non-limiting embodiment shown, first sub-housing includes a cup-like member having a base 111A with at least one sidewall 111B extending axially upward therefrom. The sidewall defines an open end 111C opposite base 111A. The cup-like member may have any shape or outer contour. In the non-limiting embodiment shown, the cup-like member has a cylindrical sidewall with a circular base. The second sub-housing 112 may include a cap with a top wall 112A and a cap sidewall 112B. Cap sidewall 112B is located radially inward or outward of sidewall 111B allowing the sidewalls of first sub-housing 111 and second sub-housing 112 to overlap each other to an extent to facilitate attachment. In the example shown, the cap sidewall 112B is radially outward of sidewall 111B defining a cap open end 112C that receives the sidewall 111B therein. An attachment assembly or fastener 113 extends between the overlapping portion of sidewall 111B and cap sidewall 112B to attach them to each other. For example, an internal thread 113B may be formed on the cap sidewall 112B. In the example shown, external thread 113A extends radially outward from sidewall 111B adjacent to open end 111C of first subhousing 111 and an internal thread 113B is formed on an interior surface of cap sidewall 112B of second subhousing 112.

With continued reference to the non-limiting embodiment shown in FIGS. 1, 2 and 3, the filter 120 is adapted for filtering fluid aqueous urea solution 40. The filter 120 may have any shape or configuration suitable for the filtering application including cyclonic filters, screen filters or the pleated cylindrical configuration shown. Filter 120 is received within the housing 110 and may include an end cap or other structural element 118 for engagement with a portion of housing. The housing 110 may contain one or more interior features adapted to engage other components such as filter 120 for support or location of the filter or to guide flow of fluid aqueous urea solution 40 therethrough. For example, a divider, generally indicated by the number 125, may extend into the housing 110 to engage filter 120. Divider 125 as discussed more completely below is used to segregate the flow path into an inlet section and outlet section and defines an inlet flow path and outlet flow path relative to filter 120 within housing 110.

With reference to FIGS. 1, 2 and 3, filter 120 has a first side 122 and a second side 124. In the non-limiting embodiment shown in FIGS. 1 and 3, the filter 120 separates the interior region 114 of the housing 110 into a first region 126, on a first side of the filter 122, and a second region 128 on a second side of the filter 124. In the non-limiting embodiment shown in FIGS. 1 and 3, the filter 120 defines a substantially hollow cylinder with a central bore 120A closed to flow by engagement with a portion of housing 110. For example, upper portion of filter 120 may include a cylindrical cap 118A to close an end of the filter element and define a central opening into which the filtered fluid is received. Divider 125 includes a cylindrical wall 127 that engages filter cap 118A to cordon off the bore 120A. An outlet opening 115A is provided in divider 125 in registry with first aperture 115 to allow fluid aqueous urea to exit bore 120A. Divider 125 also separates exterior region 116 radially outward thereof, which is in communication with second aperture 117 such that fluid entering the filter 124 enters housing 110 via second aperture 117. In the non-limiting embodiment shown, bore 120A is closed near base 111A of housing 110 by a filter base 118B to force filtered fluid entering bore 120A through the filter medium forming the cylindrical wall between cap 118A and base 118B to exit through outlet opening 115A. A seal extending upward from base 111A may be provided to help close bore 120A. A seal may also be provided on an end of filter 124 to provide the same effect. The interior bore 120A of the cylinder corresponds to the first region 126, while the exterior of the cylinder corresponds to the second region 128. The first region 126 communicates with the first aperture 115. The second region 128 communicates with second aperture 117. Depending on the flow path of the filter, first region 126 and second region 128 may be upstream or downstream regions. In the example shown, first region 126 is downstream of second region 128 (upstream region).

With continued reference to the non-limiting embodiment shown in FIGS. 1, 2 and 3, the heater 130 extends into the interior region 114 of the housing 110. Without limitation, the heater 130 may be an electric cartridge heater having a connector located externally of housing and a heat element extending into heater 130, housing 110. Heat element may be located at any location internal or external to housing 110 to apply heat to the AUS therein. In the non-limited embodiment shown, heater 130 is centrally located within the interior 114 of housing 110. Top wall 112A defines a heater opening through which heater 130 extends axially inward into housing interior 114 and within bore 120A of filter 120. A divider 125 is located radially outward of heater 130. The divider 125 registers within the bore 120A defining a first region inward thereof in communication with bore 120A and a second region outward thereof. The heater 130 is adapted to produce heat energy and impart heat to nearby materials and components. In certain non-limiting embodiments, as will be explained in detail herebelow, the heater 130 is operationally engaged with one or more components that facilitate heat transfer, one or more components that impede heat transfer, or both in order to transfer heat to desired materials and components at a desired rate.

With continued reference to the non-limiting embodiment shown in FIGS. 1, 2 and 3, a first hose fitting 140 may be coincident with the first aperture 115. In embodiments in which the first hose fitting 140 is coincident with the first aperture 115, the fluid communication between interior region 114 and exterior region 116 provided by the first aperture 115 is provided through the first hose fitting 140. The first hose fitting 140 may be formed of a solid material that has a high thermal conductivity. Materials that have a high thermal conductivity comprise those materials that have a thermal conductivity of at least 16 W/(m*K). Without limitation, materials that have a thermal conductivity of at least 16 W/(m*K) comprise, aluminum, aluminum nitride, brass, bronze, copper, titanium, zirconium, iron, steel, and stainless steel. The first hose fitting 140 may be formed of a material resistant to corrosion when directly exposed to aqueous urea solution. Without limitation, materials that are to be considered resistant to corrosion when directly exposed to aqueous urea solution are those materials rated of at least "good" corrosion resistance in the relevant engineering literature, for example and without limitation, *Corrosion Resistance Tables, Fifth Edition*, Part D, pages 3369-3372, by Philip A. Schweitzer, P. E, at the relevant operating temperatures for an SCR system. Without limitation, materials that are to be considered resistant to corrosion when directly exposed to aqueous urea solution may include 316 stainless steel, 304 stainless steel, titanium, and zirconium.

With continued reference to the non-limiting embodiment shown in FIGS. 1, 2 and 3, a second hose fitting 150 may be coincident with the second aperture 117. In embodiments in which the second hose fitting 150 is coincident with the second aperture 117, the fluid communication between interior region 114 and exterior region 116 provided by the second aperture 117 is provided through the second hose fitting 150. The second hose fitting 150 may be formed of a solid material that has a high thermal conductivity. Materials that have a high thermal conductivity comprise those materials that have a thermal conductivity of at least 16 W/(m*K). Without limitation, materials that have a thermal conductivity of at least 16 W/(m*K) comprise, aluminum, aluminum nitride, brass, bronze, copper, titanium, zirconium, iron, steel, and stainless steel. The second hose fitting 150 may be formed of a material resistant to corrosion when directly exposed to aqueous urea solution. Without limitation, materials that are to be considered resistant to corrosion when directly exposed to aqueous urea solution are those materials rated of at least "good" corrosion resistance in the relevant engineering literature, for example and without limitation, *Corrosion Resistance Tables, Fifth Edition*, Part D, pages 3369-3372, by Philip A. Schweitzer, P. E, at the relevant operating temperatures for an SCR system. Without limitation, materials that are to be considered resistant to corrosion when directly exposed to aqueous urea solution may include 316 stainless steel, 304 stainless steel, titanium, and zirconium.

With continued reference to the non-limiting embodiment shown in FIGS. 1, 2 and 3, in FIGS. 1 and 3 the heat bridge 160 thermally connects the heater 130 to the first hose fitting 140, and thermally connects the heater 130 to the second hose fitting 150. Thermal connection facilitates transfer of heat between the connected components. The heat bridge 160 may be formed of a solid material that has a high thermal conductivity. Materials that have a high thermal conductivity comprise those materials that have a thermal conductivity of at least 16 W/(m*K). Without limitation, materials that have a thermal conductivity of at least 16 W/(m*K) comprise, aluminum, aluminum nitride, brass, bronze, copper, titanium, zirconium, iron, steel, and stainless steel. As shown in FIGS. 1 and 3, in certain non-limiting embodiments, portions of the heat bridge 160 may be insulated to prevent heat loss to undesired components or regions. In the non-limiting embodiment shown in FIGS. 1 and 3, the heat bridge is insulated at locations B close to the exterior region 116 to prevent heat transferred by the heat bridge 160 from being lost the exterior region 116. As shown in the non-limiting embodiment shown in FIGS. 1 and 3, the heat bridge 160 may optionally be engaged to the heater 130 with an optional mechanical fastener 190 adapted to facilitate transfer of heat between the heater 130 and the heat bridge 160. In non-limiting FIG. 2, the heat bridge 160' is shown, for sake of contrast and understanding only, in a non-functional state such that heat bridge 160' is shown as not providing thermal connection from the heater 130 to the first hose fitting 140, and not providing thermal connection from the heater 130 to the second hose fitting 150.

With continued reference to the non-limiting embodiment shown in FIGS. 1, 2, and 3, a first insulator 170 at least partially covers the first hose fitting 140 and insulates the first hose fitting 140 from the exterior region 116 to impede heat transferred to the first hose fitting 140 being lost the exterior region 116. In certain non-limiting embodiments, as shown in FIGS. 1 and 3, the heat bridge 160 and the first hose fitting 140 may both be in thermal engagement and both may be insulated from the exterior region 116 by first insulator 170. The first insulator 170 may be formed of a solid material that has a low thermal conductivity. Materials that have a low thermal conductivity comprise those materials that have a thermal conductivity of no more than 0.25 W/(m*K). Without limitation, materials that have a thermal conductivity of no more than 0.25 W/(m*K) comprise, nylon 6 and acrylic glass.

With continued reference to the non-limiting embodiment shown in FIGS. 1, 2, and 3, a second insulator 180 at least partially covers the second hose fitting 150 and insulates the second hose fitting 150 from the exterior region 116 to prevent heat transferred to the second hose fitting 150 from being lost the exterior region 116. In certain non-limiting embodiments, as shown in FIGS. 1 and 3, the heat bridge 160 and the second hose fitting 150 may both be in thermal engagement and both may be insulated from the exterior region 116 by second insulator 180. The second insulator 180 may be formed of a solid material that has a low thermal conductivity. Materials that have a low thermal conductivity comprise those materials that have a thermal conductivity of no more than 0.25 W/(m*K). Without limitation, materials that have a thermal conductivity of no more than 0.25 W/(m*K) comprise, nylon 6 and acrylic glass. In some embodiments the second insulator 180 and the first insulator 170 may be formed of the same unitary component.

With continued reference to the non-limiting embodiment shown in FIGS. 1, 2, and 3, in certain embodiments, and without limitation, there is a defined or pre-determined direction of flow for fluid aqueous urea solution 40 through filter assembly 100 such that there is an upstream direction and downstream direction through filter assembly 100 wherein fluid aqueous urea solution 40 flows from the upstream direction to the downstream direction and from an upstream region to a downstream region. In such embodiments, it should be understood that the first region 126 may be identified as a downstream region downstream of the filter 120 and that the second region 128 may be identified as an upstream region upstream of the filter 120.

In the desired operation of the non-limiting embodiment shown in FIGS. 1, 2 and 3, fluid aqueous urea solution 40 flows into housing 110 by entering second aperture 117; flows through second hose fitting 150 into the second region 128 outside filter 120; flows across the filter 120 from second side 124 to first side 122 and into first region 126; flows through first hose fitting 140 and flows out of housing 110 by exiting first aperture 115.

Under some conditions the fluid aqueous urea solution 40 in the filter assembly 100 can freeze. For example, in some embodiments, the fluid aqueous urea solution 40 is a formulations that freezes at −11 Centigrade. Fluid aqueous urea solution 40 can freeze into frozen aqueous urea solution 40' if exposed to temperatures at or below at −11 Centigrade. When it becomes desirable to operate the filter assembly 100, with frozen aqueous urea solution 40' therein, the frozen aqueous urea solution 40' can impede or entirely prevent desired flow through the filter assembly 100. Accordingly, it is desirable under such conditions to thaw the frozen aqueous urea solution 40' in the filter assembly 100 quickly. It should be understood that some regions of the filter assembly 100 are more critical to flow than are other regions. For example and without limitation, in the embodiment shown in FIG. 1, the frozen aqueous urea solution 40' is entirely frozen throughout the filter assembly 100. Flow of frozen aqueous urea solution 40' through the filter assembly 100 in the embodiment shown in FIG. 1, is not possible. By way of further example and without limitation, in the embodiment shown in FIG. 2, the heater 130 is operated to thaw the frozen aqueous urea solution 40'. As noted above, the embodiment in FIG. 2 is shown with a non-operative heat bridge 160'. Accordingly the heat H generated by heater 130 first affects and thaws the frozen aqueous urea solution 40' closest to heater 130. The result is that, at least in the very near term following initiation of heating, there is fluid aqueous urea solution 40 in the filter assembly 100 near the heater 130 that has thawed, but the fluid aqueous urea solution 40 cannot flow through the filter assembly because regions necessary to flow, such as, without limitation, first hose fitting 140 and second hose fitting 150, are still occluded by frozen aqueous urea solution 40', which has yet to thaw due to it being distal from the heater 130. In the contrasting embodiment shown in FIG. 3, the heat bridge 160 is functional. Accordingly, in FIG. 3, some of the heat H generated by heater 130 flows through the heat bridge 160, into the thermally connected first hose fitting 140, into the thermally connected second hose fitting 150, and from each hose fitting 140, 150 into the frozen aqueous urea solution 40' therein to thaw it. As some of the heat H from the heater affects and thaws the frozen aqueous urea solution 40' closest to heater 130, some portion of the heat H from heater 130 is also thawing the frozen aqueous urea solution 40' in the hose fittings 140, 150. The result is that, at least in the very near term following initiation of heating, there is fluid aqueous urea solution 40 in the filter assembly 100, that can flow through the filter assembly 100 because regions necessary to flow, such as, without limitation, the regions within first hose fitting 140 and second hose fitting 150, are also thawed.

Figure 4:
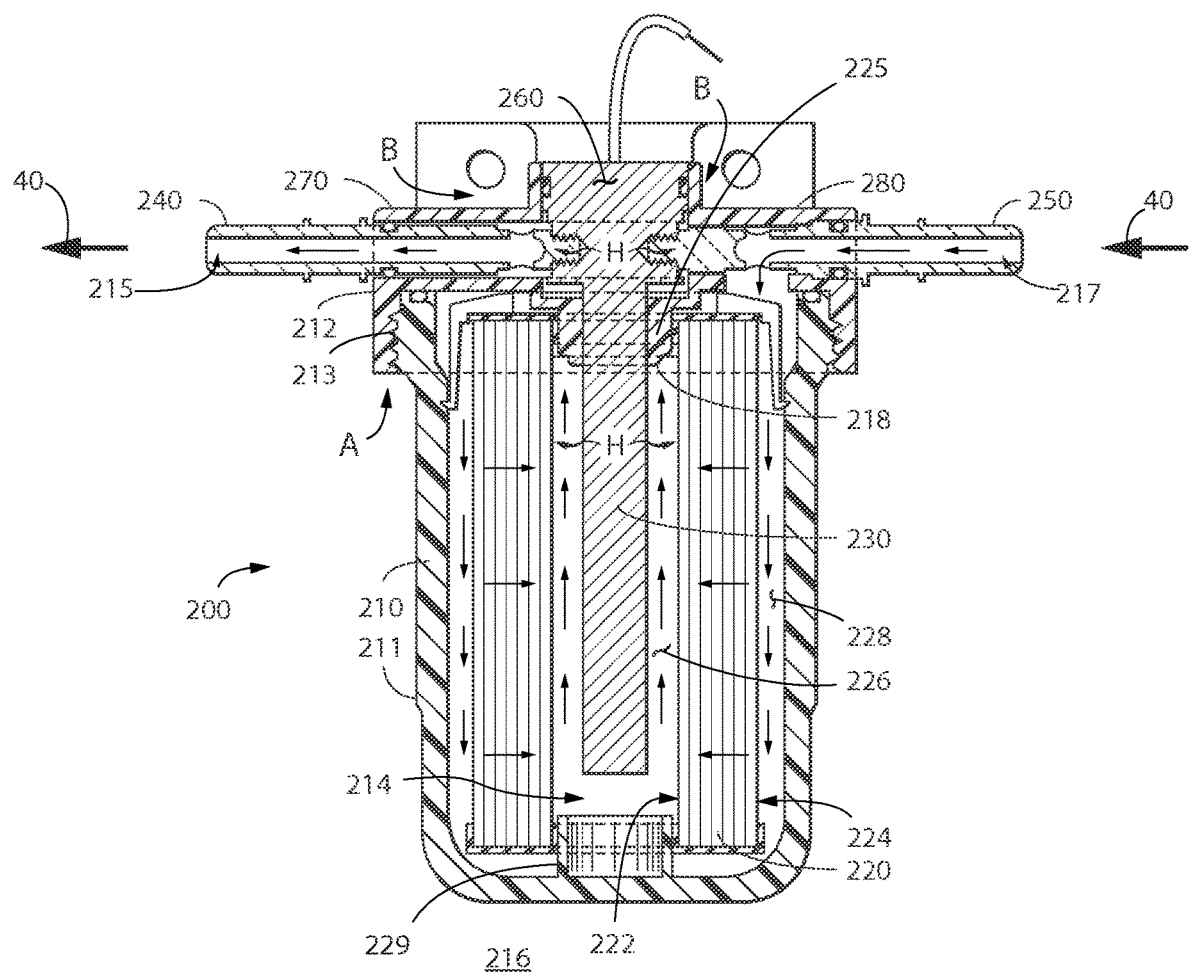
FIG. 4 is an sectional elevational view of a second embodiment of a filter inline heater.

Referring now to FIG. 4, shown is a second embodiment of a filter assembly 200. The first embodiment of a filter assembly 200 comprises a housing 210, a filter 220, a heater 230, a first hose fitting 240, a second hose fitting 250, a heat bridge 260, a first insulator 270, and a second insulator 280. In the non-limiting second embodiment shown in FIG. 4, the filter assembly 200 is adapted to filter a fluid aqueous urea solution, schematically shown at 40.

With continued reference to FIG. 4, housing 210 defines an interior region 214 and exterior region 216. The interior region 214 and exterior region 216 are in communication with one another through a first aperture 215 and through a second aperture 217. The housing 210 may be formed as a single piece or multiple sub-housings or components may be assembled to form housing 210. With continued reference to FIG. 4, housing 210 may comprise a first sub-housing 211 and a second sub-housing 212. The first sub-housing 211 and the second sub-housing 212 may each comprise one or more engagement components 213 to facilitate fluid tight engagement to one or more other components. For example and without limitation, in FIG. 4, first sub-housing 211 and a second sub-housing 212 are threadedly engaged by fastener 213 to one another at A. Fastener 213 may be any suitable fastener as discussed in the earlier embodiment including the threaded fastener shown. It should be understood that other fasteners may include, but are not limited to, a compression fitting, welding, soldering, brazing, mechanical fasteners, adhesives, etc., and that threaded engagement is only one acceptable fastening means. The housing 210 may contain one or more interior features 218 adapted to engage other components, or guide flow of fluid aqueous urea solution 40 therethrough. In the embodiment shown, interior feature 218 includes a divider 225 that extends axially inward from second sub-housing 212. Divider 225 is sized to fit within the bore 220A defined by filter 220 to separate the interior region 214 from exterior region 216. Interior feature 218 may also include a support 229 that extends axially inward from an opposite end of housing to support a base of filter 220. In the example shown, support 229 is a cylindrical plug that extends axially inward from first sub-housing 211 at least partially into bore 220A opposite divider 225 to close the bore 220A at each end.

With continued reference to the non-limiting embodiment shown in FIG. 4, the filter 220 is adapted for filtering fluid aqueous urea solution 40. The filter 220 is supported within the housing 210. The filter 220 has a first side 222 and a second side 224. In the non-limiting embodiment shown in FIG. 4, the filter 220 separates the interior region 214 of the housing 210 into a first region 226, on a first side of the filter 220, and a second region 228 on a second side 224 of the filter 220. In the non-limiting embodiment shown in FIG. 4, the filter 220 defines a substantially hollow cylinder with the bottom closed to flow by engagement with support 229 of housing 210, the top and interior of the cylinder corresponds to the first region 226, while the exterior of the cylinder corresponds to the second region 228. The first region 226 comprises first aperture 215. The second region 228 comprises second aperture 217.

With continued reference to the non-limiting embodiment shown in FIG. 4, the heater 230 extends into the interior region 214 of the housing 210. Without limitation, the heater 230 may be an electric cartridge heater. The heater 230 is adapted to produce heat energy and impart heat to nearby materials and components. In certain non-limiting embodiments, as will be explained in detail hereinbelow, the heater 230 is operationally engaged with one or more components that facilitate heat transfer, one or more components that impede heat transfer, or both in order to transfer heat to desired materials and components at a desired rate.

With continued reference to the non-limiting embodiment shown in FIG. 4, a first hose fitting 240 may be coincident with the first aperture 215. In embodiments in which the first hose fitting 240 is coincident with the first aperture 215, the fluid communication between interior region 214 and exterior region 216 provided by the first aperture 215 is provided through the first hose fitting 240. The first hose fitting 240 may be formed of a solid material that has a high thermal conductivity. The first hose fitting 240 may be formed of a material resistant to corrosion when directly exposed to aqueous urea solution.

With continued reference to the non-limiting embodiment shown in FIG. 4, a second hose fitting 250 may be coincident with the second aperture 217. In embodiments in which the second hose fitting 250 is coincident with the second aperture 217, the fluid communication between interior region 214 and exterior region 216 provided by the second aperture 217 is provided through the second hose fitting 250. The second hose fitting 250 may be formed of a solid material that has a high thermal conductivity. The second hose fitting 250 may be formed of a material resistant to corrosion when directly exposed to aqueous urea solution.

It is to be understood that the term "hose fitting" is not intended to be limited to components adapted to provide engagement adapted for fluid communication to associated hoses in particular, but to extend to associated pipes, associated ducts, and other sorts of associated conduits generally. Moreover, the hose fittings 140, 150, 240, 250 may each be engaged with an associated conduit by any means chosen with good engineering judgment including, but not limited to, threaded engagement, a hose barb, a mechanical fastener, a clamp, an adhesive, welding, brazing, soldering, or some combination thereof.

With continued reference to the non-limiting embodiment shown in FIG. 4, the heat bridge 260 thermally connects the heater 230 to the first hose fitting 240, and thermally connects the heater 230 to the second hose fitting 250. Thermal connection facilitates transfer of heat between the connected components. The heat bridge 260 may be formed of a solid material that has a high thermal conductivity. As shown in FIG. 4, in certain non-limiting embodiments, portions of the heat bridge 260 may be insulated to prevent heat loss to undesired components or regions. In the non-limiting embodiment shown in FIG. 4, the heat bridge is insulated at locations B close to the exterior region 216 to prevent heat transferred by the heat bridge 260 from being lost the exterior region 216. As shown in the non-limiting embodiment shown in FIG. 4, the heat bridge 260 may optionally be engaged with the heater 230 through being unitarily formed or cast therewith. As shown in the non-limiting embodiment shown in FIG. 4, the heat bridge 260 may optionally be thermally engaged to one or both of the hose fittings 240, 250 by threaded engagement. As shown in the non-limiting embodiment shown in FIG. 4, the heat bridge comprises female threaded holes into which male threaded fittings may be threadedly engaged to provide the desired thermal connection. Similar to the above explanation regarding engagement with respect to the housing, it should be understood that there are many acceptable means to facilitate thermal engagement, compression fitting, welding, soldering, brazing, mechanical fasteners, adhesives, etc., and that threaded engagement is only one such means.

With continued reference to the non-limiting embodiment shown in FIG. 4, a first insulator 270 at least partially covers the first hose fitting 240 and insulates the first hose fitting 240 from the exterior region 216 to impede heat transferred to the first hose fitting 240 being lost the exterior region 216. In certain non-limiting embodiments, as shown in FIG. 4, the heat bridge 260 and the first hose fitting 240 may both be in thermal engagement and both may be insulated from the exterior region 216 by first insulator 270. The first insulator 270 may be formed of a solid material that has a low thermal conductivity.

With continued reference to the non-limiting embodiment shown in FIG. 4, a second insulator 280 at least partially covers the second hose fitting 250 and insulates the second hose fitting 250 from the exterior region 216 to impede heat transferred to the second hose fitting 250 being lost the exterior region 216. In certain non-limiting embodiments, as shown in FIG. 4, the heat bridge 260 and the second hose fitting 250 may both be in thermal engagement and both may be insulated from the exterior region 216 by second insulator 280. The second insulator 280 may be formed of a solid material that has a low thermal conductivity.

With continued reference to the non-limiting embodiment shown in FIG. 4, in certain embodiments, and without limitation, there is a defined or pre-determined direction of flow for fluid aqueous urea solution 40 through filter assembly 200 such that there is an upstream direction and downstream direction through filter assembly 200 wherein fluid aqueous urea solution 40 flows from the upstream direction to the downstream direction and from an upstream region to a downstream region. In such embodiments, it should be understood that the first region 226 may be identified as a downstream region downstream of the filter 220 and that the second region 228 may be identified as an upstream region upstream of the filter 220.

In the desired operation of the non-limiting embodiment shown in FIG. 4, fluid aqueous urea solution 40 flows into housing 210 by entering second aperture 217; flows through second hose fitting 250 into the second region 228 outside of filter 220; flows across the filter 220 from second side 224 to first side 222 and into first region 226; flows through first hose fitting 240 and flows out of housing 210 by exiting first aperture 215.

Under some conditions the fluid aqueous urea solution 40 in the filter assembly 200 can freeze. For example, in some embodiments, the fluid aqueous urea solution 40 is a formulations that freezes at −11 Centigrade. Fluid aqueous urea solution 40 can freeze into frozen aqueous urea solution 40' if exposed to temperatures at or below at −11 Centigrade. When it becomes desirable to operate the filter assembly 200 with frozen aqueous urea solution 40' therein, the frozen aqueous urea solution 40' can impede or entirely prevent desired flow through the filter assembly 200. Accordingly, it is desirable under such conditions to thaw the frozen aqueous urea solution 40' in the filter assembly 200 quickly. For example and without limitation, in the embodiment shown in FIG. 4, some of the heat H generated by heater 230 flows through the heat bridge 260, into the thermally connected first hose fitting 240, into the thermally connected second hose fitting 250, and from each hose fitting 240, 250 into the frozen aqueous urea solution 40' therein to thaw it. As some of the heat H from the heater affects and thaws the frozen aqueous urea solution 40' closest to heater 230, some portion of the heat H from heater 230 is also thawing the frozen aqueous urea solution 40' in the hose fittings 240, 250. The result is that, at least in the very near term following initiation of heating, there is fluid aqueous urea solution 40 in the filter assembly 200, that can flow through the filter assembly 200 because regions necessary to flow, such as, without limitation, the regions within first hose fitting 240 and second hose fitting 250, are also thawed.

While the subject matter has been described with reference to certain embodiments, it will be understood by those skilled in the art that various changes may be made and equivalents may be substituted without departing from the scope of the subject matter. In addition, many modifications may be made to adapt a particular situation or material to the teachings of the subject matter without departing from its scope. Therefore, it is intended that the subject matter not be limited to the particular embodiment disclosed, but that the subject matter will include all embodiments falling within the scope of the appended claims.

What is claimed is:

1. A filter assembly comprising:
   a housing comprising an interior and exterior, the interior and the exterior in fluid communication through a first aperture and a second aperture;
   a filter capable of filtering an aqueous solution, the filter positioned within the housing, the filter separating the housing into:
      a first region upstream of the filter, the first region in fluid communication with the second aperture, and
      a second region downstream of the filter, the second region in fluid communication with the first aperture;
   a heater extending into the interior of the housing;
   a first hose fitting extending into the housing and in fluid communication with the first aperture,
   a second hose fitting extending into the housing and in fluid communication with the second aperture; and
   a heat bridge thermally connecting the heater to the first hose fitting and to the second hose fitting.

2. The filter assembly of claim 1, wherein a portion of the housing comprises an insulating material.

3. The filter assembly of claim 2, wherein the first hose fitting is formed of a material selected from the group consisting of: stainless steel, titanium, and zirconium.

4. The filter assembly of claim 2, wherein the second hose fitting is formed of a material selected from the group consisting of: stainless steel, titanium, and zirconium.

5. The filter assembly of claim 2, wherein the heat bridge is formed of a material selected from the group consisting of: aluminum, aluminum nitride, brass, bronze, copper, titanium, zirconium, iron, steel, and stainless steel.

6. The filter assembly of claim 1 wherein, the housing comprises a first portion and a second portion, wherein the first portion of the housing comprises a cap.

7. The filter assembly of claim 6, wherein the cap is in threaded engagement with the second portion of the housing.

8. The filter assembly of claim 6, wherein, the heat bridge is at least partially insulated from the exterior of the housing by the first portion of the housing.

9. The filter assembly of claim 6 wherein the first portion of the housing is formed of a material having a thermal conductivity of at most 0.25 W/(m*K).

10. The filter assembly of claim 6, wherein the second portion of the housing includes a cup-shaped structure having a base with at least one sidewall extending axially upward from the base, the sidewall defining an open end opposite the base, wherein the filter is received in the cup-shaped structure, and the first portion of the housing comprises a cap attachable to the cup-shaped structure, the cap closing the open end; wherein the heater, first hose fitting and second hose fitting are supported on the cap; wherein the first aperture and second aperture are formed in the cap.

11. The filter assembly of claim 10, wherein the cap includes a top wall and a cap sidewall extending axially downward from the top wall, the cap sidewall being located radially outward of the sidewall of the cup-shaped member, an attachment assembly connecting the cap sidewall and the sidewall of the cup-shaped member, the attachment assembly being located therebetween.

12. The filter assembly of claim 11, wherein the attachment assembly includes an external thread extending radially outward from the sidewall of the cup-shaped member and an internal thread defined in the cap sidewall.

13. The filter assembly of claim 1, wherein the first and second hose fittings have a thermal conductivity of at least 16 W/(m*K).

14. The filter assembly of claim 1 wherein the heat bridge has a thermal conductivity of at least 16 W/(m*K).

15. The filter assembly of claim 14, wherein the filter defines a central bore, the second region being within the central bore, the second aperture being located radially outward of the filter, a divider extending axially inward from the cap, the divider registering with an interior surface of the filter to fluidly separate the first region from the second region, wherein the heater extends axially inward from the cap radially inward of the divider, the heater extending into the central bore.

16. The filter assembly of claim 1, wherein, the insulating material comprises nylon.

17. The filter assembly of claim 1, wherein the filter defines a substantially hollow cylinder and the heater extends into an interior volume of the cylinder.

18. The filter assembly of claim 1, wherein the first hose fitting and second hose fitting extend radially outward from their respective first aperture and second aperture, wherein the heating element is located between the first aperture and second aperture, wherein the heat bridge extends radially outward from the heat element to thermally connect the heater to the first hose fitting and second hose fitting.

19. A filter assembly for filtering aqueous urea solution, the filter assembly comprising:
   a housing defining a pair of regions in fluid communication through a first aperture and a second aperture, wherein a portion of the housing comprises one or more insulating materials;
   a filter received within the housing, the filter separating the housing into a first region upstream of the filter, the first region in fluid communication with the second aperture, and a second region downstream of the filter, the second region in fluid communication with the first aperture;
   a heater extending into the first region, wherein the heater is thermally connected by a heat bridge with at least the second region;
   a first hose fitting in fluid communication with the first aperture; and
   a second hose fitting in fluid communication with the second aperture.

20. The filter assembly of claim 19, wherein the first hose fitting and second hose fitting are formed of a material selected from the group consisting of stainless steel, titanium and zirconium.

21. The filter assembly of claim 20, wherein the heat bridge being formed of a material selected from the group consisting of aluminum, aluminum nitride, brass, bronze, copper, titanium, zirconium, iron, steel, and stainless steel, thermally connecting the heater to the first hose fitting and to the second hose fitting.

22. The filter assembly of claim 21, wherein the filter defines a central bore and the housing includes a divider extending into the central bore to separate the first region from the second region, the divider including an opening that fluidly communicates with the first hose fitting, and wherein the second hose fitting fluidly communicates with the first region radially outward of the divider.

23. The filter assembly of claim 22 further comprising a support at an opposite end of the housing relative to the divider, wherein the support extends at least partially into the central bore.

24. The filter assembly of claim 23, wherein the heat bridge includes a portion to which the first hose connector and second hose connector are attached.

25. The filter assembly of claim 24, wherein the heat bridge has a thermal conductivity of at least 16 W/(m*K).

* * * * *